United States Patent
Yan et al.

(10) Patent No.: US 8,077,925 B2
(45) Date of Patent: Dec. 13, 2011

(54) MOTION SENSING METHOD OF SUB-PIXEL LEVEL PRECISION

(75) Inventors: Yongqing Yan, Beijing (CN); Zhiqian Li, Beijing (CN)

(73) Assignee: Beijing Sigmachip Co., Ltd, Beijing (CN)

( * ) Notice: Subject to any disclaimer, the term of this patent is extended or adjusted under 35 U.S.C. 154(b) by 609 days.

(21) Appl. No.: 12/272,571

(22) Filed: Nov. 17, 2008

(65) Prior Publication Data

US 2009/0324019 A1    Dec. 31, 2009

(30) Foreign Application Priority Data

Jun. 27, 2008    (CN) .......................... 2008 1 0115734

(51) Int. Cl.
*G06K 9/00* (2006.01)
(52) U.S. Cl. .................... 382/107; 375/240.13; 382/300
(58) Field of Classification Search .................. 382/107, 382/300
See application file for complete search history.

(56) References Cited

U.S. PATENT DOCUMENTS

| | | | | |
|---|---|---|---|---|
| 5,400,087 A | * | 3/1995 | Uramoto et al. | 348/699 |
| 7,343,044 B2 | * | 3/2008 | Baba et al. | 382/236 |
| 2004/0101058 A1 | * | 5/2004 | Sasai et al. | 375/240.26 |
| 2006/0233253 A1 | * | 10/2006 | Shi et al. | 375/240.16 |
| 2009/0016623 A1 | * | 1/2009 | Higewake | 382/236 |

\* cited by examiner

Primary Examiner — Tom Y Lu
(74) Attorney, Agent, or Firm — Sawyer Law Group, P.C.

(57) ABSTRACT

The present invention discloses a method for motion sensing of sub-pixel level precision. The method comprises the following steps: acquiring a reference image (reference frame) and a sample image (sample frame) of a surface; calculating the correlation between the reference frame and the sample frame to obtain a motion vector of a photoelectric mouse with respect to this surface; subjecting the reference frame and the sample frame to interpolation to obtain the interpolated reference frame and the interpolated sample frame; calculating the correlation between the interpolated reference frame and the interpolated sample frame in order to correct the aforesaid motion vector and to obtain the movement of the sub-pixel. The precision of displacement measurement can be improved effectively by this method under the condition that sensor's characteristics are not changed to improve the performance of the photoelectric mouse.

7 Claims, 2 Drawing Sheets

MOTION SENSING METHOD OF SUB-PIXEL LEVEL PRECISION

CROSS-REFERENCE TO RELATED APPLICATIONS

Under 35 U.S.C. 119, this application claims priority to Chinese patent application No. 200810115734.9 filed Jun. 27, 2008.

FIELD OF THE INVENTION

The present invention relates to a method for optical motion sensing, and more particularly, to a method for motion sensing of sub-pixel level precision in a photoelectric mouse.

BACKGROUND OF THE INVENTION

FIG. 1 is a working principle diagram of a photoelectric mouse. A ray of light emitted by a light emitting diode 101 is reflected by a working surface 103 after passing through a lens 102. The ray of light containing information about the working surface 103 is subjected to influx by a lens 104 and images in a motion sensing device 105. When the photoelectric mouse moves, its motion trajectory is recorded as a set of high-speed photographed coherent images, wherein each image is referred to as one frame. The motion sensing device 105 calculates the interrelationship among the stored frames in order to recognize the motion of the photoelectric mouse and to output a value of the motion.

FIG. 2 is a method, usually used by the motion sensing device 105 shown in FIG. 1, for calculating motion of a pixel. Starting from a start position, the motion sensing device 105 acquires a first image, referred to as the reference frame. After delaying a predetermined time interval, the motion sensing device 105 then acquires a second image, referred to as the sample frame.

The method illustrated in FIG. 2 generates a predicted motion vector by calculating the correlation between the reference frame and the sample frame in order to obtain moving direction and moving distance of a pixel. When the highest correlation is found by calculating the correlation between the sample frame and the reference frame, if the sample frame moves at least 0.5 pixel to at most 1.5 pixel with respect to the reference frame, the calculating result is moved one pixel. If the sample frame moves more than a predetermined value with respect to the reference frame, the reference frame is updated to the current sample frame, and the updated reference frame is used as the reference frame when the next sample frame is carried out.

In the above method, the movement is recognized in a unit of 0.5 pixel, so the recognition to the movement of the photoelectric mouse can only be updated after the motion sensing device 105 updates the reference frame. Thus, only when the photoelectric mouse moves about 1.0 pixel, the movement of the photoelectric mouse may be recognized. Therefore, the above method cannot recognize the movement of the photoelectric mouse if its movement is less than 1.0 pixel, or a sub-pixel, as a result, resolution is limited.

SUMMARY OF THE INVENTION

In order to overcome the "low resolution" defect of the current motion sensing method and increase the calculation precision, the present invention proposes a method for motion sensing of sub-pixel level precision. The precision of displacement measurement can be improved effectively by this method under the condition that sensor's characteristics are not changed to improve the performance of the photoelectric mouse.

According to an aspect of the invention, the motion sensing method of sub-pixel level precision, comprises the following steps: acquiring an image of a working surface by using an optical sensor to obtain a reference frame; acquiring an image of the working surface again after delaying a certain time to obtain a sample frame; subjecting the reference frame and the sample frame to interpolation respectively to obtain the interpolated reference frame and the interpolated sample frame; calculating the correlation between the reference frame and the sample frame to obtain a motion vector MVA; calculating the correlation between the interpolated reference frame and the interpolated sample frame to obtain an interpolation motion vector MVB; correcting and compensating MVA by using MVB to obtain an output motion vector MV; and dividing MV by N to obtain a more precise motion vector, wherein, $MV=N*MVA+MVB$, and N depends upon an image difference interpolation algorithm, and $N>1$.

Thus, a displacement of the sub-pixel precision can be obtained by using the method of the present invention, which is a greater progress technically and can effectively improve the positioning precision and performance of the photoelectric mouse. In particular, when the displacement value of the photoelectric mouse using a motion sensing sensor is sent to a computer after being reduced by 1/N factor, the movement precision of the photoelectric mouse can be increased by N times with respect to the prior art.

Other features and advantages of the invention will be explained in the specification which follows, and become obvious both from the specification and also understood by practicing the invention. The objective and advantages of the invention could be realized and obtained by following the written specification, the claims, and the structure as specifically indicated in the drawings.

Preferred embodiments are explained in conjunction with the accompanying drawings. The methods for improving displacement calculation precision of motion sensing by using image interpolation are described in detail below. It shall be indicated that the accompanying drawings here provide an explanation of the specific embodiments of the present invention. These drawings are not understood as a definition of the limits or limitations of the present invention.

DETAILED DESCRIPTION OF THE INVENTION

Figure 1:
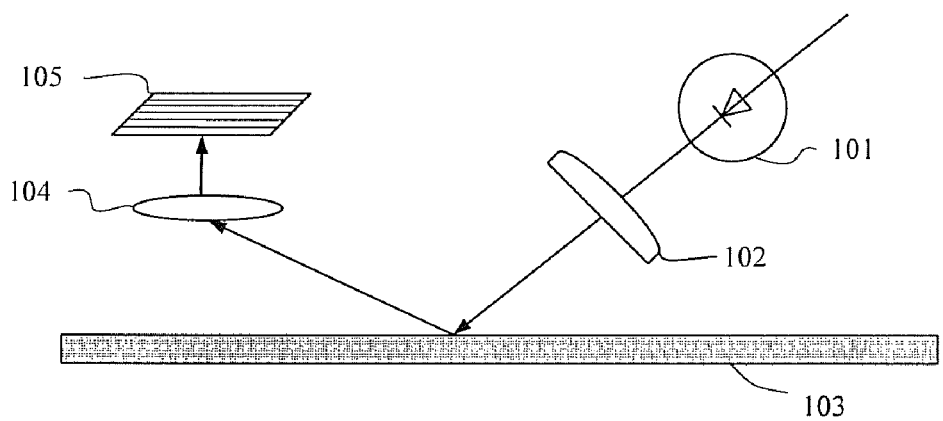
FIG. 1 is a working principle diagram of a photoelectric mouse.
Figure 2:
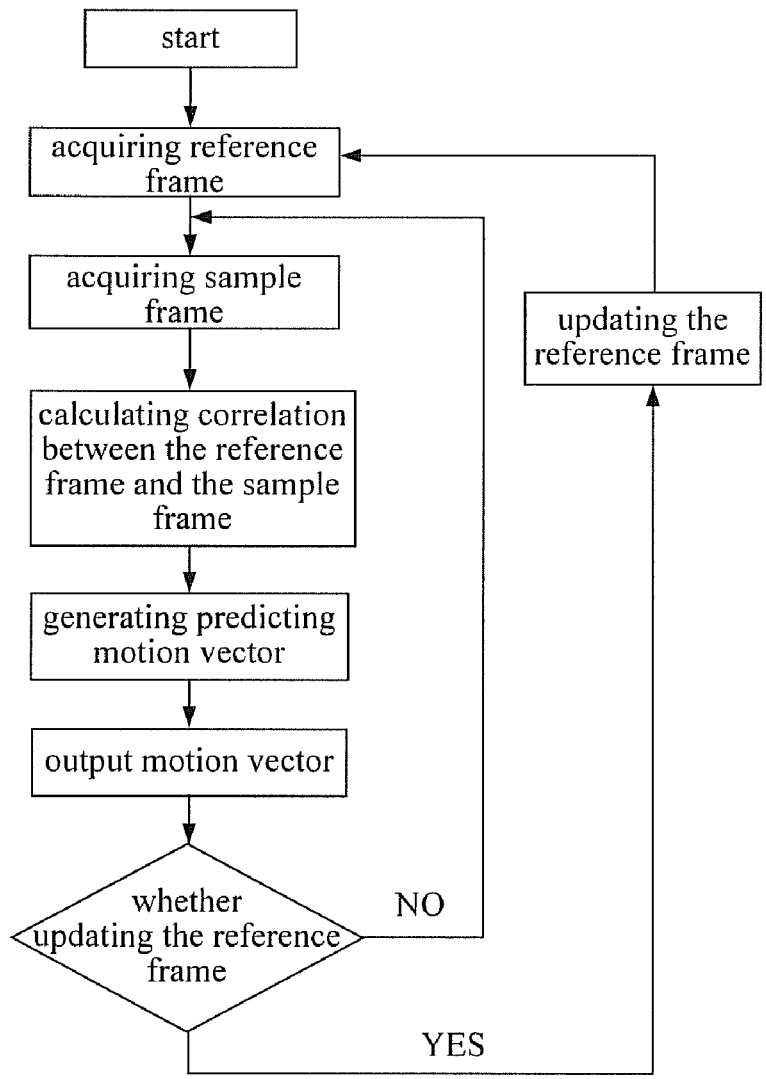
FIG. 2 is a schematic diagram of a general motion sensing method.
Figure 3:
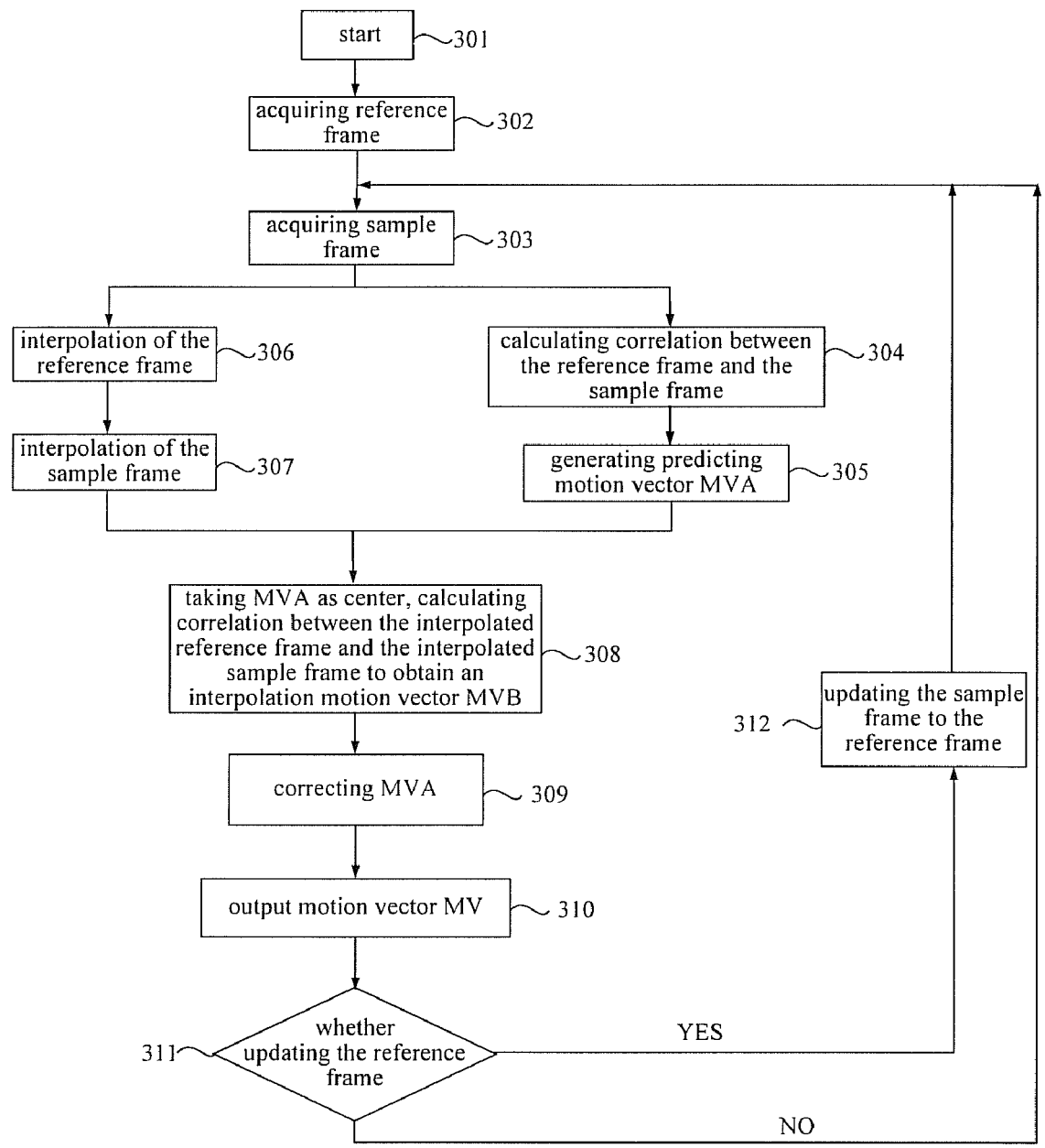
FIG. 3 is a schematic diagram of a method for calculating the movement of a sub-pixel according to the present invention.

FIG. 3 is a schematic diagram of a method for calculating the movement of a sub-pixel according to the present invention.

Starting from a start position 301, in step 302, an optical sensor acquires a frame of image as a reference frame. The reference frame contains signals acquired by a bi-dimensional photosensitive detector array, and feature information of a working surface, such as color, texture, contrast, luminance, and smoothness.

After finishing step 302, in step 303, the optical sensor acquires a frame of image as a sample frame after a specific time delay. Similar to the reference frame, the sample frame contains signals acquired by a bi-dimensional photosensitive detector and feature information of the working surface. The reference frame and the sample frame are acquired at different time, if the optical sensor moves on the working surface, then the sample frame performs translation with respect to the reference frame.

Next, in steps 304 and 305, the correlation between the sample frame and the reference frame is calculated. Motion vector MVA is found by calculating the correlation. MVA represents the size and orientation of the displacement of the sample frame with respect to the reference frame.

Meanwhile, in steps 306 and 307, the reference frame and the sample frame are subjected to image interpolation respectively to obtain the interpolated reference frame and the interpolated sample frame.

In step 308, the end point of the motion vector MVA is taken as a center, X denotes the longest step of motion, and the correlation calculation to the interpolated reference frame and the interpolated sample frame is performed to obtain an interpolation motion vector MVB. In this embodiment, X is selected as 1.

In the next step 309, the motion vector MVA is corrected and compensated by using the interpolation motion vector MVB. The interpolation motion vector MVB is also used to obtain an output motion vector MV in step 310, wherein, MV=N×MVA+MVB, and N is an interpolation parameter that depends upon an image difference interpolation algorithm, and N>1. In this embodiment, the value of N is 2, thus, MV=2×MVA+MVB.

In step 309, the motion vector can be predicted through motion estimation to reduce the degree of operation and to increase the algorithm efficiency.

In step 311, when the output motion vector MV is greater than a predetermined value, the current reference frame is updated to the sample frame (step 312); on the contrary, the reference frame remains unchanged.

Finally, the movement value of the photoelectric mouse of a motion sensing sensor, namely, the output motion vector MV, is reduced by ½ (i.e. MV/2) and then sent to a computer. At this time, the movement precision of the photoelectric mouse can be increased by 2 times with respect to the prior art.

Therefore, according to the motion sensing method provided by the present invention, the movement resolution of the photoelectric mouse can be increased effectively under the condition that sensor's characteristics are not changed to improve the performance of the photoelectric mouse.

In the present embodiment, the value of N is 2. However, in other embodiments, the interpolation algorithm may be modified to increase the value of N and to obtain an image with greater size in order to obtain a displacement smaller than 0.5 pixel.

The aforesaid are just preferred embodiments for the present invention, which are not used as limitation to the present invention. It shall be indicated that for those skilled in the art, all improvements and modifications, within the spirit and principle of the present invention are covered by the scope of the claims of the present invention.

What is claimed is:

1. A method for sensing motion of an object with respect to a surface, comprising the steps of:
    step 1, acquiring a first frame of image, and setting the first frame of image as a reference frame;
    step 2, delaying a specific time and acquiring a second frame of image, and setting the second frame of image as a sample frame;
    step 3, subjecting the reference frame and the sample frame to interpolation respectively to obtain an interpolated reference frame and an interpolated sample frame;
    step 4, calculating correlation between the reference frame and the sample frame to obtain an initial motion vector;
    step 5, calculating correlation between the interpolated reference frame and the interpolated sample frame to obtain an interpolation motion vector;
    step 6, correcting and compensating the initial motion vector according to the interpolation motion vector and an interpolation parameter to obtain a first output motion vector;
    step 7, dividing the first motion vector by the interpolation parameter to obtain a second motion vector and send the second motion vector to a computer; and
    step 8, updating the reference frame or leaving the reference frame unchanged according to the first motion vector and a predetermined value.

2. The method according to claim 1, wherein the reference frame and the sample frame contain signals acquired by a bi-dimensional photosensitive detector array, and feature information of the surface.

3. The method according to claim 1, wherein the step 5 comprising:
    taking an end point of the initial motion vector as a center; selecting a specific value as the longest step of motion; and
    calculating correlation between the interpolated sample frame and the interpolated reference frame to obtain an interpolation motion vector.

4. The method according to claim 1, wherein the first output motion vector is determined by the following relationship:
    the first output motion vector=the interpolation parameter× the initial motion vector+the interpolation motion vector.

5. The method according to claim 1, wherein the interpolation parameter depends upon an image interpolation algorithm, and the interpolation parameter is greater than 1.

6. The method according to claim 1, wherein the step 8 further comprising:
    updating the reference frame to the sample frame if the output motion vector is greater than the predetermined value; or
    leaving the reference frame unchanged if the output motion vector is not greater than the predetermined value.

7. The method according to claim 4, wherein the first output motion vector is predicted by motion estimation.

* * * * *